United States Patent
Chen et al.

(10) Patent No.: US 11,831,198 B2
(45) Date of Patent: Nov. 28, 2023

(54) UNINTERRUPTIBLE POWER SYSTEM BYPASS SWITCH CONTROL

(71) Applicant: SCHNEIDER ELECTRIC IT CORPORATION, Foxboro, MA (US)

(72) Inventors: Bo Chen, Shanghai (CN); Richard Dyrmose Olsen, Kolding (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/830,736

(22) Filed: Mar. 26, 2020

(65) Prior Publication Data
US 2021/0066959 A1    Mar. 4, 2021

(30) Foreign Application Priority Data

Aug. 30, 2019    (CN) .......................... 201910813988.6

(51) Int. Cl.
*H02J 9/06* (2006.01)
*H04L 12/40* (2006.01)

(52) U.S. Cl.
CPC .............. *H02J 9/062* (2013.01); *H02J 9/068* (2020.01); *H04L 12/40* (2013.01)

(58) Field of Classification Search
CPC ... H02J 9/068; H02J 9/062; H02J 9/06; H04L 12/40; H04L 2012/40215
See application file for complete search history.

(56) References Cited

U.S. PATENT DOCUMENTS

| | | | |
|---|---|---|---|
| 5,612,580 A * | 3/1997 | Janonis ................... | H02J 9/062 307/64 |
| 8,115,339 B2 | 2/2012 | Jung et al. | |
| 10,340,732 B2 | 7/2019 | Bach | |
| 2003/0048006 A1* | 3/2003 | Shelter, Jr. .............. | H02J 9/062 307/64 |
| 2003/0210055 A1 | 11/2003 | Porter et al. | |
| 2005/0114473 A1* | 5/2005 | Guy ..................... | G06F 15/7867 709/220 |
| 2005/0256975 A1* | 11/2005 | Kaniz ..................... | H04L 49/90 709/250 |
| 2006/0224877 A1* | 10/2006 | Jain ..................... | H04L 41/0806 713/1 |

(Continued)

FOREIGN PATENT DOCUMENTS

WO    2017187553 A1    11/2017

OTHER PUBLICATIONS

Extended European Search Report from corresponding European Application No. 20191687.1 dated Jan. 25, 2021.

*Primary Examiner* — Rexford N Barnie
*Assistant Examiner* — Rasem Mourad
(74) *Attorney, Agent, or Firm* — Lando & Anastasi, LLP

(57) ABSTRACT

Power systems and methods are provided that receive input power and provide output power to a load. Under a first state of operation, power conversion circuitry may receive the input power and provide the output power. A bypass switch includes a controller that detects a failure condition by detecting a link down state on a communications interface. In response to detecting the link down state, the switch controller operates the bypass switch to convey the input power to the output in a second state of operation. The second state of operation is a bypass state of operation whereby the power conversion circuitry is bypassed.

17 Claims, 4 Drawing Sheets

(56) References Cited

U.S. PATENT DOCUMENTS

| | | |
|---|---|---|
| 2012/0119581 A1 | 5/2012 | Silberbauer et al. |
| 2014/0132074 A1 | 5/2014 | Bush et al. |
| 2015/0061392 A1 | 3/2015 | Berard |
| 2017/0026843 A1* | 1/2017 | Lazaravich ............ H04W 12/12 |
| 2019/0165921 A1* | 5/2019 | Wu ....................... H04L 1/0015 |

* cited by examiner

UNINTERRUPTIBLE POWER SYSTEM BYPASS SWITCH CONTROL

CROSS-REFERENCE TO RELATED APPLICATION

This application claims the benefit under 35 U.S.C. § 119 of Chinese Patent Application No. 201910813988.6, filed Aug. 30, 2019, titled UNINTERRUPTIBLE POWER SYSTEM BYPASS SWITCH CONTROL, which is hereby incorporated herein by reference in its entirety.

BACKGROUND OF INVENTION

Field of the Invention

At least one example in accordance with the present invention relates generally to providing reliable power to critical loads.

Discussion of Related Art

Uninterruptible power systems (UPS) provide power to a critical load, and include on-line UPS's and off-line UPS's. On-line UPS's provide conditioned alternating current (AC) power as well as back-up AC power upon interruption of a primary source of AC power. Off-line UPS's typically do not provide conditioning of input AC power but provide back-up AC power upon interruption of the primary AC power source.

SUMMARY

Aspects and embodiments are generally directed to uninterruptible power systems that include a bypass switch to selectively couple a power input to a power output to bypass power conversion or other circuitry, such as in times of failure of such circuitry.

According to one aspect, a power system is provided that includes an input configured to be coupled to a power source and to receive input power from the power source, an output configured to be coupled to a load and to provide output power to the load, power conversion circuitry coupled to the input and the output and configured to receive the input power and to provide the output power, a bypass switch coupled to the input and the output and configured to selectively couple the input to the output to convey the input power to the output as the output power, and a switch controller coupled to the bypass switch and configured with a communications interface, the switch controller configured to detect a link reset condition at the communications interface and, in response to detecting the link reset condition, to control the bypass switch to be in a bypass state of operation in which the bypass switch conveys the input power to the output as the output power.

Some embodiments include a unit controller coupled to the power conversion circuitry and configured with a communications interface that is coupled to the communications interface of the switch controller, the unit controller configured to detect a failure condition and, in response to detecting the failure condition, to generate the link reset condition at the communications interface. The unit controller may include watchdog logic configured to detect the failure condition by reaching a timeout threshold. In some examples the timeout threshold may be 500 microseconds or less.

In certain embodiments, the switch controller may be further configured to confirm the link reset condition after a confirmation period and to control the bypass switch to be in the bypass state of operation in response to confirming the link reset condition. The confirmation period may be 500 microseconds or less in certain embodiments.

In some embodiments, the switch controller includes a field programmable gate array and the communications interface includes a physical layer interface circuitry and the physical layer interface circuitry is coupled to the field programmable gate array by a media independent interface.

According to another aspect, a power system is provided that includes an input configured to be coupled to a power source and to receive input power from the power source, an output configured to be coupled to a load and to provide output power to the load, power conversion circuitry coupled to the input and the output and configured to receive the input power and to provide the output power, and a unit controller coupled to the power conversion circuitry and configured with a communications interface, the unit controller configured to detect a failure condition and, in response to detecting the failure condition, to generate a link reset condition at the communications interface.

Certain embodiments also include a bypass switch coupled to the input and the output and configured to selectively couple the input to the output to convey the input power to the output as the output power and a switch controller coupled to the bypass switch and configured with a communications interface that is coupled to the communications interface of the unit controller, the switch controller configured to detect the link reset condition at the communications interface and, in response to detecting the link reset condition, to control the bypass switch to be in a bypass state of operation in which the bypass switch conveys the input power to the output as the output power. The switch controller may be further configured to confirm the link reset condition after a confirmation period and to control the bypass switch to be in the bypass state of operation in response to confirming the link reset condition. In some embodiments the confirmation period may be 400 microseconds or less.

According to various embodiments, the unit controller may include watchdog logic configured to detect the failure condition by reaching a timeout threshold, and in some examples the timeout threshold may be 500 microseconds or less.

In some embodiments, the unit controller includes a field programmable gate array and the communications interface includes a physical layer interface circuitry and the physical layer interface circuitry is coupled to the field programmable gate array by a media independent interface.

According to another aspect, a method of providing output power to a load is provided. The method includes receiving input power from a power source, processing the input power by power conversion circuitry to provide output power to the load in a first mode of operation, the power conversion circuitry controlled by a unit controller, detecting a failure condition of at least one of the power conversion circuitry or the unit controller, resetting a communications interface, by the unit controller, responsive to detecting the failure condition, detecting the communications interface reset, by a switch controller, and controlling a bypass switch, by the switch controller, responsive to the communications interface reset, to provide the input power as the output power to the load in a second mode of operation.

Some embodiments include monitoring, by the unit controller, for an event to occur at regular intervals, wherein detecting the failure condition includes detecting that the event has failed to occur for a timeout threshold.

Certain embodiments include confirmatory detecting the communications interface reset, by the switch controller, after a confirmation period, wherein controlling the bypass switch to be in the second mode of operation is responsive to the confirmatory detection of the communications interface reset.

According to various embodiments, controlling the bypass switch to be in the second mode of operation is configured to occur substantially within one millisecond of the failure condition.

In some embodiments, resetting the communications interface includes controlling a physical layer circuitry.

In certain embodiments, detecting the communications interface reset includes receiving an interrupt from a physical layer circuitry via a media independent interface.

Still other aspects, embodiments, examples, and advantages of these exemplary aspects and embodiments are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures may be represented by a like or similar numeral. For purposes of clarity, not every component may be labeled in every figure. In the figures.

DETAILED DESCRIPTION

Figure 1:
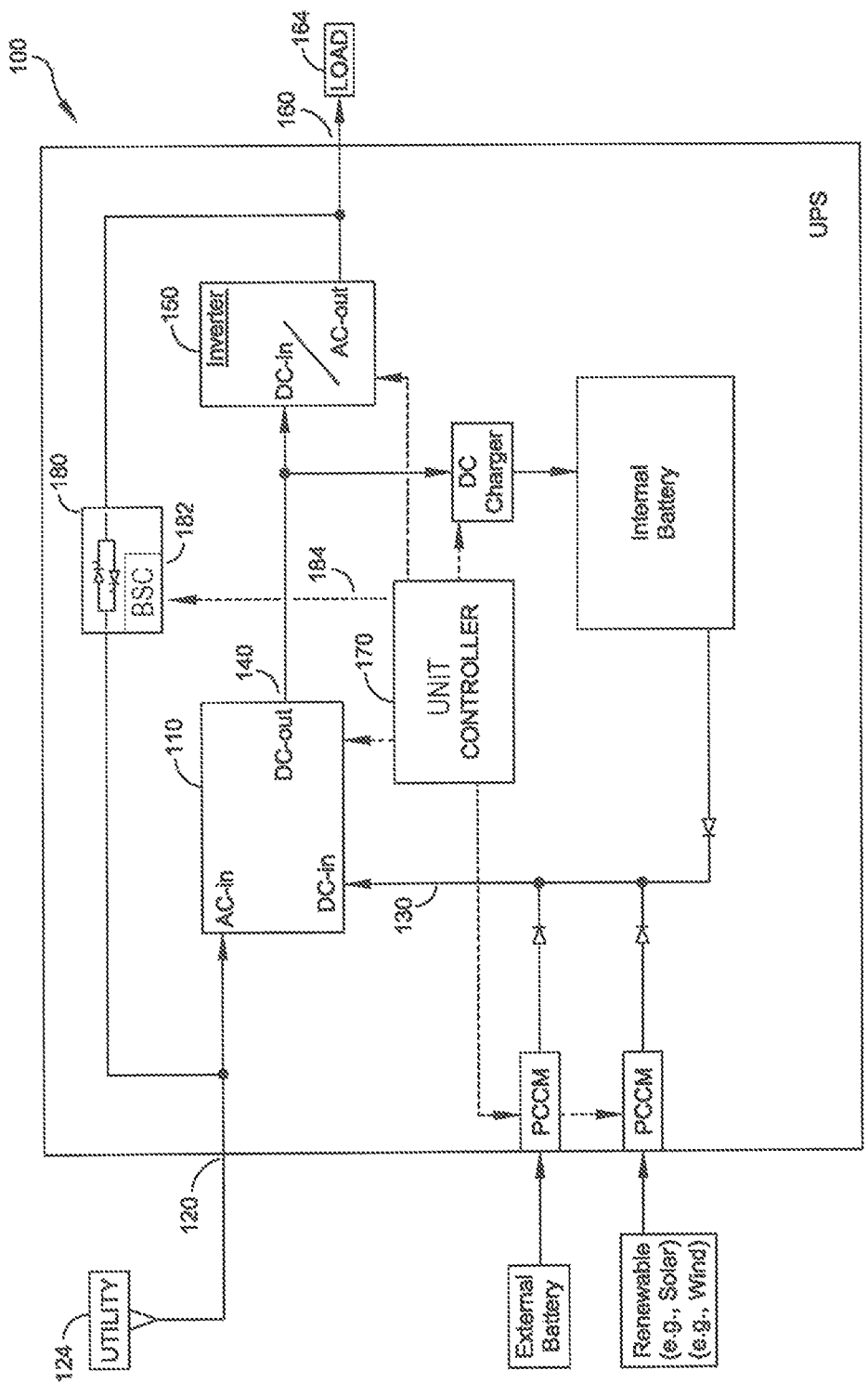
FIG. 1 is a block diagram of an example of an uninterruptible power system (UPS)

Systems and methods discussed herein are directed to uninterruptible power systems and methods that include a unit controller that controls various power switching, conversion circuitry, battery charging, and the like, and a bypass switch that allows power to be delivered directly to a load (e.g., by coupling a power source to the load and bypassing other circuitry), such as during a failure in any of the unit controller or other components. The uninterruptible power systems and methods described herein include internal Ethernet based communications components. The Ethernet communications components provide a controller area network and are controlled in a manner that allows rapid detection of a unit controller failure, such that a bypass switch controller may act to close the bypass switch, to continue providing power to a load during the failure condition. Conventional systems and methods are incapable of using Ethernet based communications as a controller area network because Ethernet connections are commonly believed unsuitable for embedded real-time applications.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Uninterruptible power systems are commonly used to provide regulated, uninterrupted power to sensitive and/or critical loads, or any load to which a reliable source of power is desired. FIG. 1 shows an example of an on-line UPS 100 in accord with aspects and embodiments disclosed herein. The UPS 100 includes a converter 110 having an alternating current (AC) input 120, a direct current (DC) output 140, and (optionally) a DC input 130. The DC output 140 provides power to an inverter 150 that converts DC power into AC power and provides the AC power at an AC output 160 to power a load 164. A unit controller 170 controls the operation of the converter 110, the inverter 150, and various other components. In various embodiments, one or more batteries and/or battery charging components may be included, and power conditioning and control modules (PCCM) may couple DC sources to the (optional) DC input 130.

A bypass switch 180 is included and may at times couple the AC input 120 to the AC output 160, bypassing the converter 110 and the inverter 150, to provide AC power from the AC input 120 to the AC output 160, such as during times of an operating failure of the converter 110, the inverter 150, the unit controller 170, or other components. Accordingly, the bypass switch 180 may include a bypass switch controller (BSC) 182 that controls the bypass switch 180 to be in an open circuit condition or a closed circuit condition at various times. The unit controller 170 and the bypass switch controller 182 may communicate with each other through a communications channel 184, which may be referred to as a controller area network. The communications channel 184 enables internal communications between the controllers, e.g., the unit controller 170 and the bypass switch controller 182. In conventional systems, the controller area network may be, e.g., a serial interface such as an RS-485/TIA-485 interface, commonly referred to as a 485 bus, or similar. Aspects and embodiments disclosed herein, however, use a packetized or datagram-oriented communications interface, such as an Ethernet (e.g., IEEE 802.3) type interface, as the communications channel 184, to enable communications between the controllers.

At least one challenge of providing such an interface for controller area communications includes meeting a timing requirement for communicating a failure of the unit controller 170. A failure of the unit controller 170, for instance, may require rapid response by the bypass switch controller 182, e.g., to operate the bypass switch 180 to be in a closed circuit condition, sufficiently quickly to continue providing power to the AC output 160. In various embodiments, the bypass switch controller 182 may need to react in about one millisecond or less. In various embodiments, the bypass switch controller 182 must respond to the unit controller 170 malfunction by closing the bypass switch 180 within 800 to 1,200 microseconds (e.g., 0.8 to 1.2 milliseconds). Aspects and embodiments disclosed herein control and/or monitor a standardized packet-oriented communications interface in such a manner that allows rapid detection of a failure of the unit controller 170 without requiring specialized protocols to be communicated over the interface. The communication channel 184, in accord with aspects and embodiments of systems and methods described herein, may operate in accord with any of various standards (e.g., IEEE 802.3 standards or the like) yet may, with operation as described herein, provide embedded time-critical indication of failure of the unit controller 170.

Figure 2:
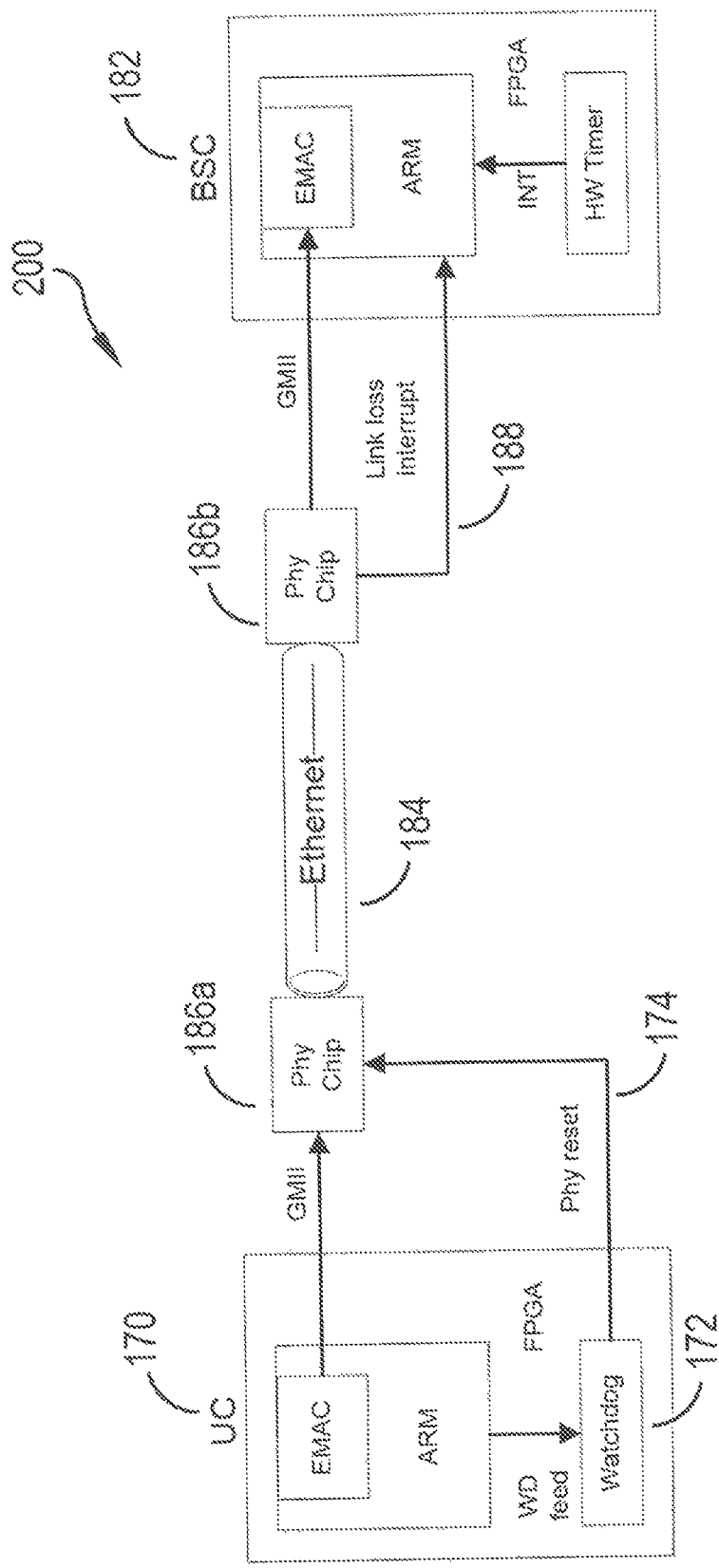
FIG. 2 is a block diagram of an example of a unit controller and a bypass switch controller, each of a UPS, interconnected by a communications channel

FIG. 2 illustrates one example of a sub-system 200 including a unit controller 170 and a bypass switch controller 182 in communication over a communications channel 184 that is an Ethernet based communications channel Each of the unit controller 170 and the bypass switch controller 182 may include a media independent interface (MII), which may be a gigabit media independent interface (GMII/RG-MII), to a physical layer (PHY) chip 186 that implements a standardized physical layer interface, such as an Ethernet physical layer interface. In at least one embodiment, the PHY chip 186 may be a Marvell® 88E1512P semiconductor chip that implements an integrated 10/100/1000 Mbps Ethernet Transceiver. Each of the unit controller 170 and the bypass switch controller 182 may include an Ethernet media access controller (EMAC) that communicates with the PHY chip 186 over the media independent interface, for example. In various embodiments, each of the unit controller 170 and the bypass switch controller 182 may include a processor based on reduced instruction set computing (RISC), and may be an advanced RISC machine (ARM) processor, which may be integrated with or in a field programmable gate array (FPGA), as shown. For example, in at least one embodiment either or both of the unit controller 170 and the switch bypass controller 182 may be an Altera® (Intel®) Cyclone® V SoC which includes an embedded ARM Cortex-A9MP core and FPGA programmable logic. In various embodiments, however, different processors and/or processor architectures including varying hardware architectures and instruction sets may be included and may interface with or otherwise control a PHY chip in various ways.

For the examples described herein, the unit controller 170 may be monitored for failure and the bypass switch controller 182 may detect such a failure by the systems and methods described herein. Various embodiments, however, may use systems or methods in accord with aspects and embodiments described herein to monitor any system, processor, controller, etc., and detect such failure at any other system, processor, controller, etc., over a communications channel that may otherwise operate according to various standards, even though such standards may not provide for real-time or time critical communication of a failure message, and even though such standards may not be otherwise suitable for time-critical or real-time embedded applications.

With continued reference to FIG. 2, a failure in the unit controller 170 may be "communicated" to the bypass switch controller 182, and detected by the bypass switch controller 182, by a purposeful physical layer reset, in accord with systems and methods disclosed herein.

For example, the unit controller 170 may include a watchdog logic 172 encoded in the FPGA or equivalent circuitry, and the ARM processor may run a task that "feeds" the watchdog logic 172 at regular intervals. For example, the processor may run a process that regularly provides an indication of regular operation, such as resetting a clock or a timer of the watchdog logic 172, and the watchdog logic 172 may monitor that the clock doesn't exceed a threshold. For example, if the clock is reset at a regular interval, e.g., under normal operation of the unit controller 170, the clock won't exceed the threshold, but if the processor is not operating normally the clock may exceed the threshold. When the watchdog logic 172 detects that a timeout threshold is met, the watchdog logic 172 controls the PHY chip 186a to reset the communications link 184. For example, in at least one embodiment, the processor may run a task that updates the watchdog logic 172 at a 10 kHz rate, e.g., every 100 microseconds. The watchdog logic 172 monitors such operation and if a timeout threshold of, e.g., 500 microseconds, goes by without the update, the watchdog logic 172 may reset the PHY chip 186a, to indicate to the bypass switch controller 182 that a failure has occurred in the unit controller 170.

On the other side of the communications channel 184, the bypass switch controller 182 may include FPGA logic dedicated to supporting detection of the reset, e.g., a link down condition, by the PHY chip 186b. In various embodiments, the bypass switch controller 182 may be configured to program the PHY chip 186b to detect and notify of a link down event, e.g., to provide an interrupt 188 upon detecting link loss. Receiving such an interrupt 188 may be interpreted by the bypass switch controller 182 as an indication of failure at the unit controller 170, and the bypass switch controller 182 may close the bypass switch 180 in response to the interrupt 188. Accordingly, the bypass switch 180 may be placed in a closed condition to bypass the various other power components, to continue providing AC power to the load 164 (see FIG. 1) during the failure condition. For example, if the watchdog logic 172 controls the PHY chip 186a to reset upon a threshold timeout of, e.g., 500 microseconds, the bypass switch controller 182 may be notified of the failure at the unit controller 170 well within a 1.0 millisecond response time.

In some embodiments, the bypass switch controller 182 may confirm that a received interrupt 188 is a failure notification, e.g., instead of a temporary link loss, by subsequently examining registers of the PHY chip 186b after a period of time. In some embodiments, the bypass switch controller 182 may set a hardware timer for a certain interval and at the end of the interval may confirm with the PHY chip 186*b* that the link remains down. In such embodiments, the bypass switch controller 182 may interpret the link down event, followed by the link remaining down for the certain interval, to be an indication that the unit controller 170 has failed. In response thereto, the bypass switch controller 182 may close the bypass switch 180.

For example, in various embodiments, the unit controller 170 may include watchdog logic that controls a PHY chip to reset a communications link if the unit controller 170 fails to maintain normal operation (e.g., as detected by resetting or "feeding" the watchdog logic at intervals) by a timeout threshold period. In some embodiments, the timeout threshold may be 500 microseconds or less. In various embodiments, the bypass switch controller 182 may detect the reset of the communications link by controlling a PHY chip to provide a link loss interrupt 188 and may interpret the reset of the communications link as a message that the unit controller 170 has failed, and may close a bypass switch 180 in response thereto. In some embodiments, the bypass switch controller 182 may confirm from the PHY chip 186*b* that the interrupt 188 is a link loss event, and may optionally set a hardware time to re-confirm the link loss event after a confirmation period. In some embodiments, the confirmation period may be 500 microseconds. In other embodiments, to account for the detection time for link loss by the PHY chip, the confirmation period may be less than 500 microseconds to achieve 1 millisecond response time. For example, in one embodiment, in which auto negotiation is used to achieve a fast reaction time, the detection time for link loss may be 100 microseconds and the confirmation period used is 400 microseconds.

Accordingly, in some embodiments, a 1.0 millisecond response time may be achieved by a 500 microsecond timeout threshold period (e.g., prior to sending a failure message in the form of a link reset) by the unit controller 170 combined with a 400 microsecond confirmation period (e.g., prior to interpreting the link reset as a failure message) by the bypass switch controller 182. Further, various embodiments may achieve other response times using various timeout threshold periods associated with a watchdog logic 172 or similar and/or various confirmation periods associated with a confirmation timer or similar.

Figure 3:
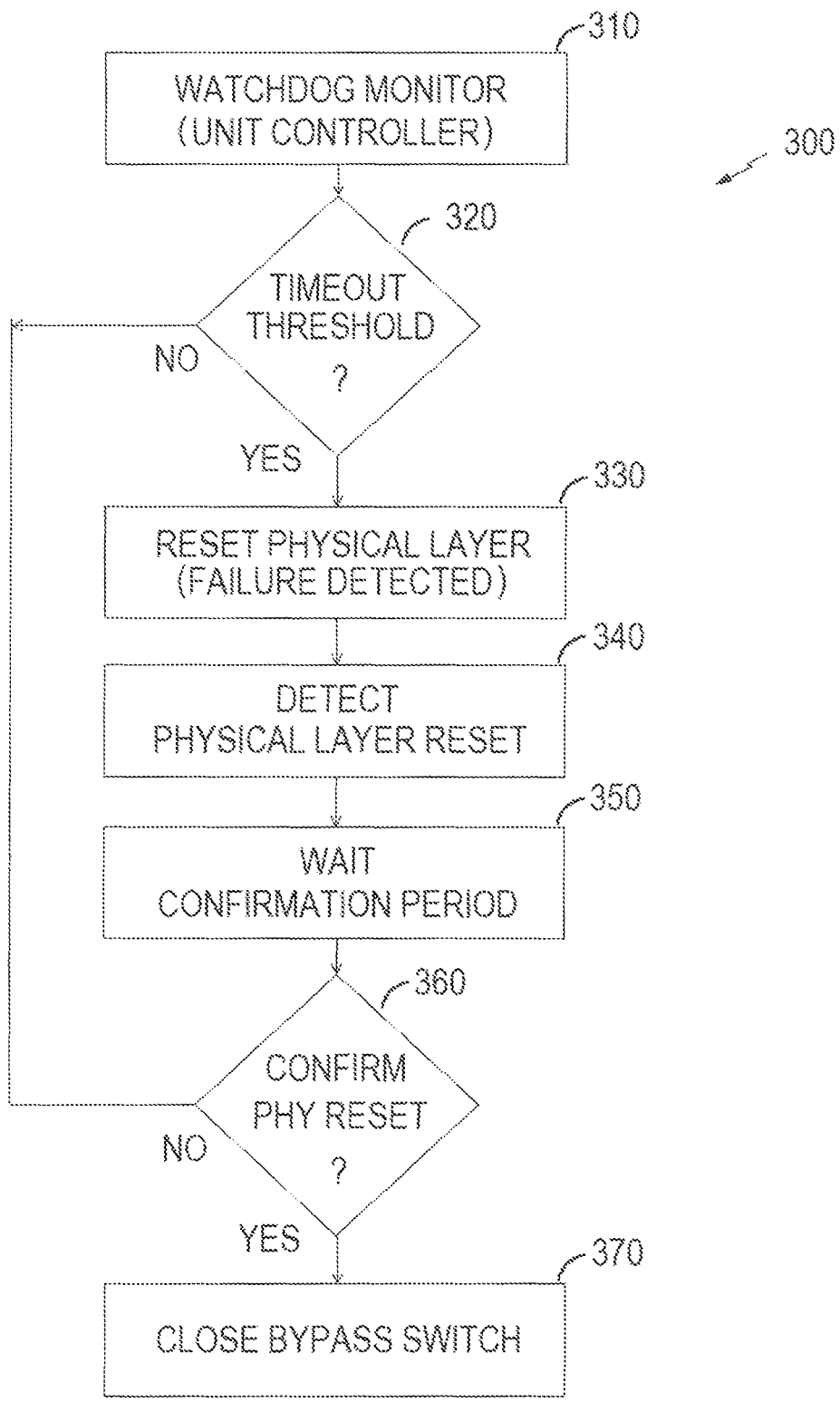
FIG. 3 is a flow diagram of an example method of operating a UPS.

FIG. 3 illustrates an example method 300 that may be implemented by the unit controller 170 and the bypass switch controller 182 in a UPS. According to the example method 300, the unit controller 170 includes a watchdog function that monitors (block 310) for a failure by detecting whether a timeout threshold is met (block 320). If the timeout threshold is met, a failure has been detected and the watchdog function controls a PHY interface to reset (block 330). The bypass switch controller 182 may detect the physical layer reset (e.g., link down condition) (block 340) and, in some embodiments, may interpret the physical layer reset as a failure notification and close the bypass switch 180 in response thereto. In other embodiments, the bypass switch controller 182 may wait a confirmation period (block 350) and confirm the physical layer reset (block 360) at the expiration of the confirmation period. If the physical layer reset is confirmed, the bypass switch controller 182 interprets the confirmed physical layer reset as a failure notification and closes the bypass switch 180 (block 370) in response thereto. In various embodiments, failure detection may be accomplished in different or additional ways. For example, various hardware failure detection schemes may be incorporated, in addition to or instead of a watchdog scheme, to detect a failure, and a PHY reset may be triggered or caused, e.g., as a failure notification, by any of various failure detections mechanisms.

Figure 4:
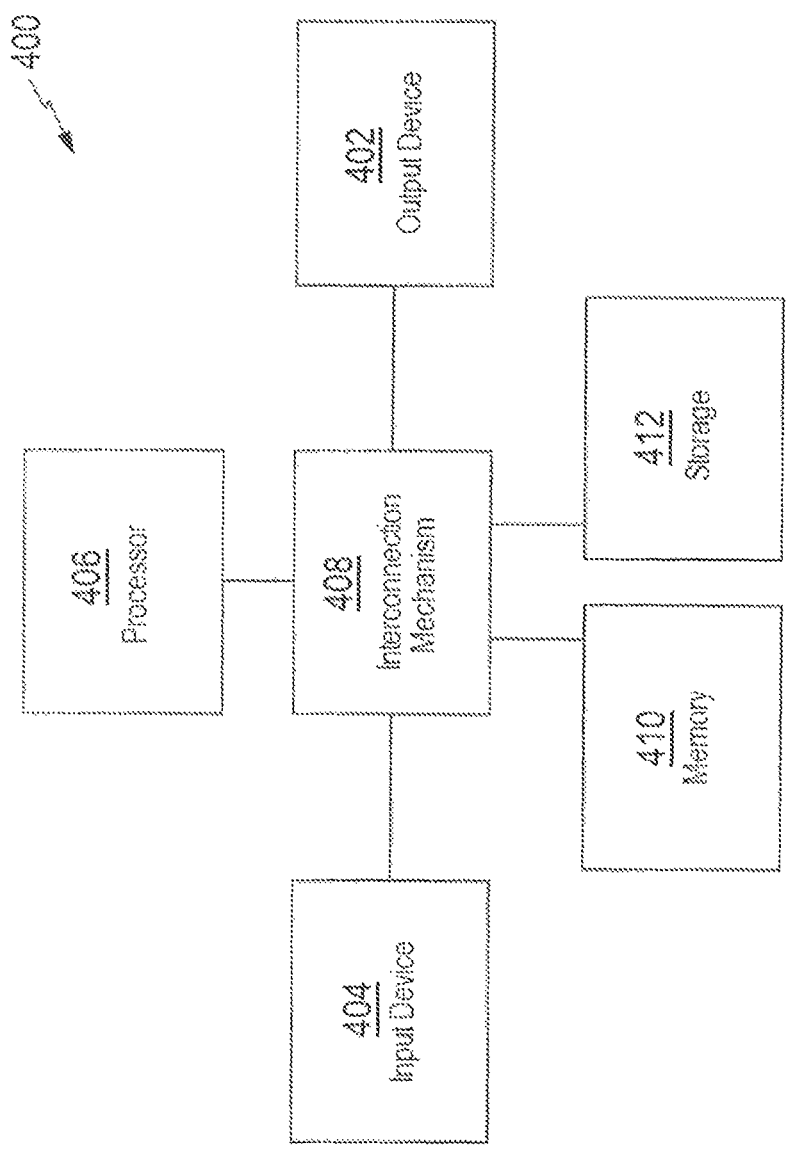
FIG. 4 is an example block diagram of computing components forming a system which may be configured to implement one or more aspects of the present invention.

FIG. 4 illustrates an example block diagram of computing components forming a computing system 400 which may be configured to implement one or more aspects disclosed herein. For example, the controllers 170, 182, or similar may include a computing system 400, or a computing system 400 may be included in a UPS, e.g., UPS 100, to provide the function of a controller, or to provide a management interface to an operator, or to communicate with other devices, such as a communications interface to the utility grid 124, etc.

The computing system 400 may include for example a computing platform such as those based on general computing processors, specialized processors, or microcontrollers. Computing system 400 may include specially-programmed, special-purpose hardware, for example, an application-specific integrated circuit (ASIC), or more generally designed hardware, such as a field programmable gate array (FPGA), or a general purpose processor, or any combination of these. Additionally, various aspects of the present disclosure may be implemented as specialized software executing on a computing system 400.

The computing system 400 may include a processor/ASIC 406 connected to one or more memory devices 410, such as a disk drive, memory, flash memory, embedded or on-chip memory, or other device for storing data. Memory 410 may be used for storing programs and data during operation of the computing system 400. Components of the computing system 400 may be coupled by an interconnection mechanism 408, which may include one or more buses and/or a network. The interconnection mechanism 408 enables communications of, e.g., data and instructions, to be exchanged between components of the computing system 400. The computing system 400 may also include one or more input devices 404, which may include, for example, a keyboard, a mouse, a touch screen, and the like, or interfaces for the connection of such devices. The computing system 400 may also include one or more output devices 402, which may include, for example, a display, a buzzer, alarm, or other audio indicator, a light, or other visual indicator, and the like, or similar interfaces. In addition, the computing system 400 may contain one or more interfaces (not shown) that may connect the computing system 400 to a communication network, in addition to or as an alternative to the interconnection mechanism 408.

The computing system 400 may include a storage component 412, which may include a computer readable and/or writeable nonvolatile medium in which signals may be stored to provide a program to be executed by the processor/ASIC 406 or to provide information stored on or in the medium to be processed by the program. The medium may, for example, be a disk or flash memory or other non-volatile memory including programmable read-only memory (PROM) of various types, and in some examples may include random access memory (RAM). In some embodiments, the processor may cause data to be read from the nonvolatile medium into another memory 410 that allows for faster access to the information by the processor/ASIC 406 than does the medium. This memory 410 may be a volatile, random access memory such as a dynamic random access memory (DRAM) or static memory (SRAM). It may be located in storage component 412 or in memory 410. The processor/ASIC 406 may manipulate the data within the memory 410 and copy the data to the storage 412 after processing is completed. Either or both of the memory 410 and storage 412 may be integrated in the processor/ASIC 406.

The computing system 400 may include a computer platform that is programmable using a high-level computer programming language. The computing system 400 may also be implemented using specially programmed or special purpose hardware, e.g. an ASIC. The processor/ASIC 406 may execute a core low-level operating system and may also execute a high-level operating system which may be, for example, a Windows operating system available from the Microsoft Corporation, a MAC OS System X or iOS operating system available from Apple Computer, a Solaris Operating System available from Sun Microsystems, a UNIX and/or LINUX operating system available from various sources, an Android operating system available from Google, Inc. Many other operating systems may be used, including bare metal and/or virtual computing systems.

In certain embodiments, a UPS has one or more controllers in accord with aspects and embodiments disclosed herein, which may include a processor, which may be any of the above or other suitable processors, including FPGAs and/or ASICs, and may run an instruction set or operate upon other logic, to implement control of various components as discussed above.

Some embodiments of UPS methods and systems, in accord with the aspects and embodiments disclosed herein, may provide single phase power or three phase power, and may receive input power in single phase or three phase form from any of the various power inputs, or any combination thereof. Embodiments disclosed herein can provide uninterruptible power to critical loads and/or to a utility grid using multiple power sources, including energy storage, renewable energy sources, and non-renewable energy sources. Conventional and modern sources, and future energy sources, are accommodated in some embodiments by various power conditioning and control modules (PCCM).

In certain embodiments, a converter such as the converter 110 may be or may include a power factor correction (PFC) circuit, and may aggregate power from one energy source at a time or may controllably aggregate power from multiple energy sources, and may provide power to one or more energy outputs. Additionally, the converter 110 may include power interfaces capable of both receiving and providing power, such as, for example, the AC input 120 may receive AC power input but may also act as a power output when, e.g., the converter 110 converts excess renewable or stored energy to feed power back to a utility grid.

In various embodiments, a controller such as controllers in accord with those discussed above may be a system control module (SCM) that is an intelligent power manager that selects which energy source or sources to use at any given time, to maintain power to the load and minimize energy costs. Such controllers may accomplish energy arbitrage by utilizing energy storage during peak electricity rates and recharging the energy storage during off peak rates. UPS's and controllers in accord with those discussed above may be capable of selling surplus renewable or battery power back to the utility via a bypass loop or bi-directional frond end power converter (e.g., out the AC input 120), which may also be controlled by the controller.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power system comprising:
an input configured to be coupled to a power source and to receive input power from the power source;
an output configured to be coupled to a load and to provide output power to the load;
power conversion circuitry coupled to the input and the output and configured to receive the input power and to provide the output power;
a bypass switch coupled to the input and the output and configured to selectively couple the input to the output to convey the input power to the output as the output power;
a switch controller coupled to the bypass switch and configured with a communications interface having physical layer interface circuitry to establish a communications link, the switch controller configured to detect a reset of the communications link at the physical layer interface circuitry, to receive an interrupt from the physical layer interface circuitry and, in response to the interrupt, to control the bypass switch to be in a bypass state of operation in which the bypass switch conveys the input power to the output as the output power; and
a unit controller configured with a communications interface having physical layer interface circuitry coupled to the physical layer interface circuitry of the switch controller to establish the communications link, the unit controller configured to detect a failure condition and, in response to detecting the failure condition, to generate the reset of the communications link by resetting the physical layer interface circuitry of the unit controller.

2. The power system of claim 1 wherein the unit controller includes watchdog logic configured to detect the failure condition by reaching a timeout threshold.

3. The power system of claim 2 wherein the timeout threshold is 400 microseconds or less and a link loss detect time is less than 100 microseconds.

4. The power system of claim 1 wherein the switch controller is further configured to confirm the reset of the communications link after a confirmation period and to control the bypass switch to be in the bypass state of operation in response to confirming the reset of the communications link.

5. The power system of claim 4 wherein the confirmation period is 500 microseconds or less.

6. The power system of claim 1 wherein the switch controller includes a field programmable gate array and the physical layer interface circuitry is-coupled to the field programmable gate array by a media independent interface.

7. A power system comprising:
an input configured to be coupled to a power source and to receive input power from the power source;
an output configured to be coupled to a load and to provide output power to the load;
power conversion circuitry coupled to the input and the output and configured to receive the input power and to provide the output power;
a unit controller coupled to the power conversion circuitry and configured with a communications interface having physical layer interface circuitry to establish a communications link, the unit controller configured to detect a failure condition and, in response to detecting the failure condition, to generate a reset of the communications link by resetting the physical layer interface circuitry of the communications interface;

a bypass switch coupled to the input and the output and configured to selectively couple the input to the output; and a switch controller coupled to the bypass switch and configured with a communications interface that is coupled to the communications interface of the unit controller, the switch controller configured to detect the reset of the communications link, to receive an interrupt from the communications interface and, in response to the interrupt, to control the bypass switch to be in a bypass state of operation.

8. The power system of claim 7 wherein the switch controller is further configured to confirm the rest of the communications link after a confirmation period and to control the bypass switch to be in the bypass state of operation in response to confirming the rest of the communications link.

9. The power system of claim 8 wherein the confirmation period is 500 microseconds or less.

10. The power system of claim 7 wherein the unit controller includes watchdog logic configured to detect the failure condition by reaching a timeout threshold.

11. The power system of claim 10 wherein the timeout threshold is 500 microseconds or less.

12. The power system of claim 7 wherein the unit controller includes a field programmable gate array and the physical layer interface circuitry is coupled to the field programmable gate array by a media independent interface.

13. A method of providing output power to a load, the method comprising:

receiving input power from a power source;

processing the input power by power conversion circuitry to provide output power to the load in a first mode of operation, the power conversion circuitry controlled by a unit controller having a communications interface with physical layer interface circuitry to establish a communications link;

detecting a failure condition of at least one of the power conversion circuitry or the unit controller;

resetting the communications link by controlling the physical layer interface circuitry of the communications interface, by the unit controller, responsive to detecting the failure condition;

detecting the reset of the communications link by a switch controller having a physical layer interface circuitry, wherein detecting the reset of communications link includes receiving an interrupt from the physical layer interface circuitry; and controlling a bypass switch, by the switch controller, responsive to the interrupt, to provide the input power as the output power to the load in a second mode of operation.

14. The method of claim 13 further comprising monitoring, by the unit controller, for an event to occur at regular intervals, wherein detecting the failure condition includes detecting that the event has failed to occur for a timeout threshold.

15. The method of claim 13 further comprising confirmatory detecting the reset of the communications link, by the switch controller, after a confirmation period, wherein controlling the bypass switch to be in the second mode of operation is responsive to the confirmatory detection of the reset of the communications link.

16. The method of claim 13 wherein controlling the bypass switch to be in the second mode of operation is configured to occur substantially within one millisecond of the failure condition.

17. The method of claim 13 wherein resetting the communications link includes controlling the physical layer interface circuitry via a media independent interface.

* * * * *